United States Patent Office 3,574,631
Patented Apr. 13, 1971

3,574,631
APOMEROCYANINE DYES AND PHOTOGRAPHIC EMULSIONS SENSITIZED THEREWITH
Mario Gandino, Ferrania, and Agostino Baldassarri, Savona, Italy, assignors to Ferrania, S.p.A., Milan, Italy
Filed Nov. 2, 1967, Ser. No. 680,172
Int. Cl. G03c 1/10
U.S. Cl. 96—139      8 Claims

ABSTRACT OF THE DISCLOSURE

As a sensitizing dye an apomerocyanine of the formula

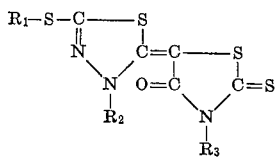

Figure 1:
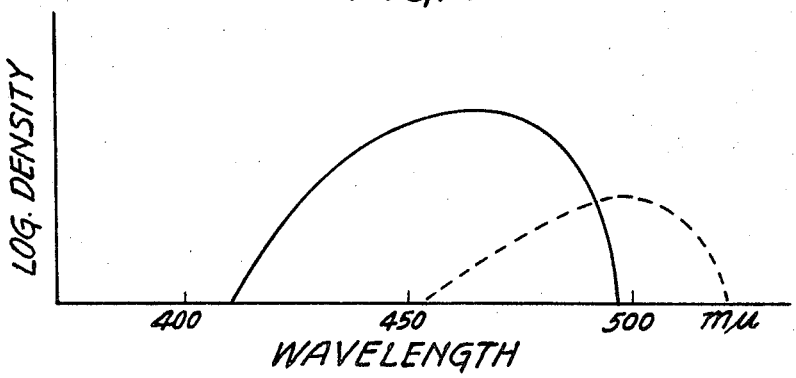

wherein $R_1$ and $R_2$ are alkyl or aralkyl and $R_3$ is alkyl, alkenyl or aryl, and photographic emulsions sensitized therewith.

---

This invention relates to novel sensitizing dyes of the apomerocyanine class, containing a substituted 1,3,4-thiadiazole nucleus, to a process for their preparation, and to light sensitive constructions in which they are incorporated.

Cyanine dyes containing a 1,3,4-thiadiazole ring are known sensitizers for photographic emulsions. French Pat. No. 792,259 describes carbocyanines and styryl derivatives, and British Pat. No. 785,939 discloses carbocyanines and carbomerocyanines derived from a 1,3,4-thiadiazole nucleus, substituted in the 2 and 5 positions by a thioether group and a reactive alkyl group. Methine and polymethine cyanines derived from a heterocyclic ring having two nitrogen atoms, e.g. diazoles, are shown in British Pat. No. 425,609, and Example 3 refers to a monomethine cyanine obtained from 2,5-dimercaptothiadiazole.

Applicants have now discovered that valauble sensitizing properties are obtained from a new class of apomerocyanines having the formula

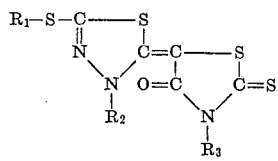

wherein $R_1$ and $R_2$ are alkyl or arylkyl (including substituted arylalkyl) and $R_3$ is alkyl (including substituted alkyl, such as carboxyalkyl, sulfoalkyl or an arylkyl), alkenyl or aryl.

In the synthesis of the sensitizing dyes of this invention use is made of 2,5-dimercaptothiadiazole [B 27, 2518 (1894)] which is dialkylated with inorganic esters, alkyl halides or aralkyl halides, according to the process which is exemplified below. After quaternization of the thiadiazole the resulting product is reacted with a rhodanine, as illustrated in the following examples.

(a) Preparation of 2,5-bis-(methylthio)-1,3,4-thiadiazole

Into a 2 liter flask, 16.5 g. (0.41 mol) of sodium hydroxide in pellet form, dissolved in 30 ml. of water and 500 ml. of ethanol are introduced. 30 g. (0.2 mol) of 2,5-dithio-1,3,4-thiadiazole are added with stirring until a thorough dissolution at room temperature is obtained, and finally the solution thus obtained is carefully treated with 50.5 g. (0.4 mol) of freshly neutralized dimethyl sulfate. The mixture is refluxed for 6 hours, then is concentrated to ⅕ of the initial volume, diluted with 1.5 liters of water and extracted with ether. The solution is dried on potassium carbonate and then evaporated. The residual oil is purified by distillation, recovering the fraction having a B.P. of 271.4° F. (133° C.)/3 mm. Hg.

(b) Preparation of 2,5-bis-(propyl-thio)-1,3,4-thiadiazole

The same procedure described in preparation (a) is followed. 30 g. (0.2 mol) of 2,5-dithio-1,3,4-thiadiazole are dialkylated with 50 g. (0.4 mol) of n-propyl bromide by heating at reflux for 12 hours. The ether extract of the dialkylation product is purified by distilling under reduced pressure the oil remaining from the evaporation of the solvent.

B.P.: 365.0° F. (185.0° C.)/10 mm. Hg.
Yield: 32 g. (69% of the theory).
Analysis.—Calculated (percent): N, 11.95; S, 40.9. Found (percent): N, 11.9; S, 40.5.

(c) Preparation of 2,5-bis-(laurylthio)-1,3,4-thiadiazole

By following the procedure of preparation (a), 30 g. (0.2 mol) of 2,5-dithio-1,3,4-thiadiazole are dialkylated with 100 g. (0.4 mol) of lauryl bromide by heating the solution at reflux for 12 hours. After evaporation of the solvent and dilution with water, instead of extracting with ether, the solid which has separated is collected on the filter. After washing with water until neutral it is crystallized from ethanol.

M.P.: 116.6° F. (47.0° C.).
Yield: 42 g. (43% of the theory).
Analysis.—Calculated (percent): N, 5.75. Found (percent): N, 5.68.

(d) Preparation of 2,5-bis-(benzylthio)-1,3,4-thiadiazole 30 g. (0.2 mol) of 2,5-dithio-1,3,4-thiadiazole are dialkylated according to the procedure of preparation (a) with 50.64 g. (0.4 mol) of benzyl chloride, by refluxing for 2 hours. Upon cooling a large part of raw 2,5-bis-(benzylthio)-1,3,4-thiadiazole separates and is collected on filter by suction. The mother liquors are concentrated to about ⅓ of their volume. By cooling, the amount of the reaction product increases, amounting in total to 62 g. By recrystallization from ethanol a M.P. of 197.6° F. (92.0° C.) and a yield of 58.8 g. (89.5% of the theory) are obtained.

Analysis.—Calculated (percent): N, 8.46; S, 29.08. Found (percent): N, 8.26; S, 28.85.

(e) Preparation of 2,5-bis(2,4-dichloro-benzylthio)-1,3,4-thiadiazole 30 g. (0.2 mol) of 2,5-dithio-1,3,4-thiadiazole are dialkylated, following the procedure described in preparation (a), with 78.5 g. (0.4 mol) of 2,4-dichloro-benzyl chloride by heating the solution at reflux for 6 hours. Upon cooling a large part of the solid reaction product separates and is collected on filter. By concentrating and cooling the filtrate an increase in the amount of solid is obtained. When crystallized from tertiary amyl alcohol, the product has an M.P. of 203.0° F. (95.0° C.).

Yield: 58 g. (62% of the theory).
Analysis.—Calculated (percent): N, 5.95; S, 20.5. Found (percent): N, 5.89; S, 20.74.

(f) Preparation of 2,5-bis-(β-phenyl-ethyl-thio)-1,3,4-thiadiazole 30 g. (0.2 mol) of 2,5-dithio-1,3,4-thiadiazole are dialkylated following the procedure described in preparation (a), with 74 g. (0.4 mol) of β-phenylethyl bromide. The reaction mixture is refluxed for 4 hours, then concentrated to small volume, diluted with water and finally filtered. The solid collected is purified by crystallization from ethanol.

M.P.: 172.4° F. (78.0° C.).

Yield: 45 g. (63% of the theory).

*Analysis.*—Calculated (percent): N, 7.81; S, 26.78. Found (percent): N, 7.68; S, 26.53.

EXAMPLE 1

1 g. of 2,5-bis-(methylthio)-1,3,4-thiadiazole and 2.2 g. of methyl p-toluene sulfonate, are heated together on an oil bath at 284.0° F. (140° C.) for 1 hour. The quaternary salt obtained is triturated with ether and thoroughly washed with the latter by decantation. After being mixed with 1.4 g. of 3-(β-carboxyethyl) rhodanine, dissolved in 15 ml. of ethanol, and mixed with 1.5 ml. of triethyl amine, it is heated at reflux for 25 minutes.

Upon cooling, the dye crystallizes out and then it is filtered, washed on the filter with alcohol and ether. It crystallizes from ethanol as small golden-yellow plates.

Absorption peak: 422 mμ.

The product corresponds to the formula:

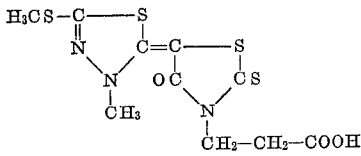

EXAMPLE 2

1 g. of 2,5-bis-(methylthio)-1,3,4-thiadiazole is quaternized with 2.2 g. of methyl p-toluene sulfate in an oil bath at 284.0° F. (140.0° C.) for 1 hour. After being washed with ether the quaternary salt thus obtained is mixed with 0.96 g. of 3-ethyl rhodanine and dissolved in 15 ml. of ethanol. Finally 1.5 ml. of triethylamine are added, and the solution is heated at reflux for 15 minutes. Upon cooling the dye separates out, then is collected on a filter, and is washed with alcohol and ether. It crystallizes from ethanol as yellow needles.

Absorption peak: 421 mμ.

The product corresponds to the formula:

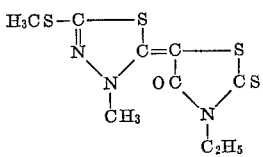

EXAMPLE 3

1.45 g. of 2,5-bis-(laurylthio)-1,3,4-thiadiazole and 1.5 ml. of diethyl sulfate are heated together on an oil bath at 248.0° F. (120° C.) for 10 minutes. After being thoroughly washed with ether by decantation the quaternary salt thus obtained is mixed with 0.55 g. of 3-allyl rhodanine, then is dissolved in 15 ml. of ethanol with 1.5 ml. of triethyl amine and heated at reflux for 15 minutes. Upon cooling with ice the dye separates out and is collected on a filter, and then is washed with alcohol and ether. It crystallizes from ethanol as extremely small, bright-yellow colored plates.

Absorption peak: 423 mμ.

The dye corresponds to the formula:

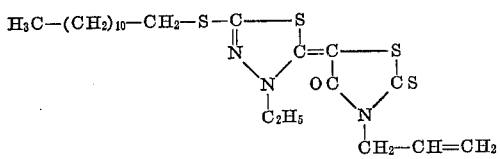

EXAMPLE 4

1 g. of 2,5-bis-(benzylthio)-1,3,4-thiadiazole and 1.5 ml. of diethyl sulfate are heated together for about 10 minutes on an oil bath at 248.0° F. (120° C.). The quaternary salt is washed by decantation several times with ether, then mixed with 0.5 g. of 3-ethyl rhodanine, dissolved in 15 ml. of ethanol with 1.5 ml. of triethyl amine. The dye separates out after a few minutes at room temperature and is collected on filter and washed with alcohol and ether. It crystallizes from ethanol as extremely small chrome-yellow colored plates.

Absorption peak: 423 mμ.

It corresponds to the formula:

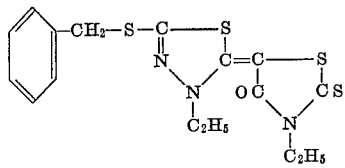

EXAMPLE 5

0.8 g. of 2,5-bis-(benzylthio)-1,3,4-thiadiazole and 1.5 ml. of diethyl sulfate are heated together for about 10 minutes on an oil bath at 248.0° F. (120° C.). The quaternary salt is washed by decantation several times with ether, then mixed with 0.43 g. of 3-allyl rhodanine, dissolved in 15 ml. of ethanol and mixed with 1.5 ml. of triethyl amine. The dye separates out at room temperature. The product thus obtained is filtered and washed with alcohol and ether. It crystallizes from ethanol as lemon-yellow colored needles.

Absorption peak: 423 mμ.

The dye corresponds to the formula:

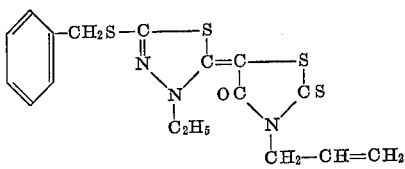

EXAMPLE 6

0.8 g. of 2,5-bis-(benzylthio)-1,3,4-thiadiazole and 1.5 ml. of diethyl sulfate are heated together for 10 minutes at 248.0° F. (120° C.). The quaternary salt is washed with ether, mixed with 0.52 g. of 3-phenyl rhodanine, dissolved in 15 ml. of ethanol, and is then mixed with 1.5 ml. of triethyl amine. The dye forms and separates out at room temperature. The precipitate is collected on a filter and washed with alcohol and ether. From ethanol the product crystallizes as orange-yellow needles.

Absorption peak: 424 mμ.

The dye corresponds to the formula:

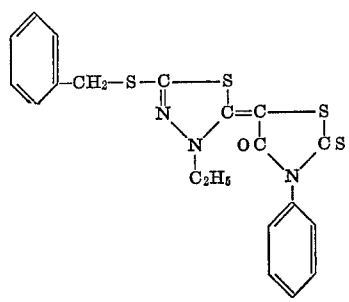

EXAMPLE 7

0.8 g. of 2,5-bis-(benzylthio)-1,3,4-thiadiazole and 1.5 ml. of diethyl sulfate are heated together on an oil bath at 248.0° F. (120° C.) for 10 minutes. The quaternary salt is triturated and washed by decantation several times with ether and is then mixed with 0.46 g. of n-butyl rhodanine, dissolved in 15 ml. of ethanol and mixed with 1.5 ml. of triethyl amine. The dye forms and precipitates without any heating. The precipitate is collected on a filter and is washed with alcohol and ether. The material crystallizes from ethanol as small, orange-yellow-colored needles.

Absorption peak: 423 mμ.

The dye corresponds to the formula:

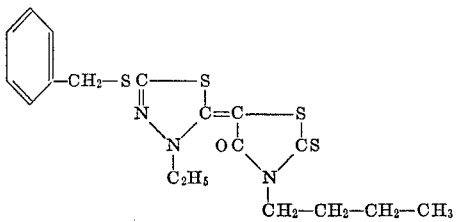

EXAMPLE 8

1.1 g. of 2,5-bis-(β-phenylethylthio)-1,3,4-thiadiazole and 1.5 ml. of diethyl sulfate are heated together at 248.0° F. (120° C.) on an oil bath. After being washed with ether the quaternary salt which has formed is then mixed with 0.5 g. of ethyl rhodanine, then dissolved in 15 ml. of ethanol. 1.5 ml. of triethyl amine are then added, and the mixture is heated at reflux for 10 minutes. Even at the elevated temperature the dye separates out. After cooling the whole mass is collected on a filter and is washed directly with alcohol and ether. The material crystallizes from ethanol as lemon-yellow platelets.

Absorption peak: 424 mμ.

The dye corresponds to the formula:

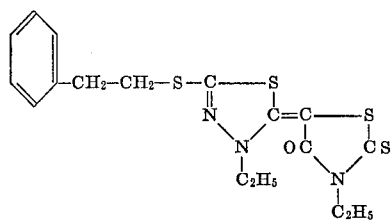

EXAMPLE 9

1.4 g. of 2,5-bis-(2,4-dichlorobenzylthio)-1,3,4-thiadiazole are salified with 1.5 ml. of diethyl sulfate on an oil bath at 248.0° F. (120° C.) for 10 minutes. The quaternary salt, thoroughly washed with ether by decantation, is then mixed with 0.5 g. of 3-ethyl rhodanine. The mixture is dissolved in 15 ml. of ethanol, and 1.5 ml. of triethyl amine is added. The solution is heated at reflux for 15 minutes, then the mass is cooled with ice. The dye separates out and is collected on filter, where it is washed with alcohol and ether. The dye crystallizes from ethanol as chrome-yellow micro-needles.

Absorption peak: 424 mμ.

It corresponds to the formula:

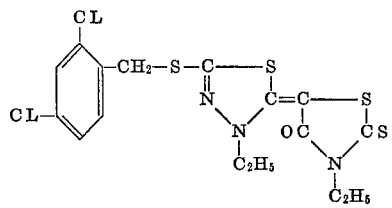

EXAMPLE 10

1.15 g. of 2,5-bis-(2,4-dichlorobenzylthio)-1,3,4-thiadiazole are salified with 1.5 ml. of diethyl sulfate on an oil bath at 248.0° F. (120° C.) for 10 minutes. The quaternary salt is thoroughly washed with ether by decantation and is treated with 0.5 g. of 3-phenyl rhodanine. The mixture is then dissolved in 15 ml. of ethanol, and 1.5 ml. of triethyl amine are added. The mixture is then heated at reflux for 10 minutes, after which it is cooled with ice. Upon cooling the dye separates out and is collected on filter, where it is washed directly with alcohol and ether.

Absorption peak: 424 mμ.

The material crystallizes from ethanol as lemon-yellow platelets.

The dye corresponds to the formula:

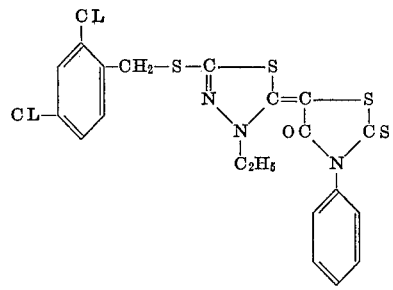

EXAMPLE 11

1.45 g. of 2,5-bis-(laurylthio)-1,3,4-thiadiazole and 1.5 ml. of diethyl sulfate are heated together for 10 minutes at 248.0° F. (120° C.) The quaternary salt thus formed is thoroughly washed with ether by decantation and is mixed with 0.63 g. of 3-phenyl rhodanine. Then 15 ml. of ethanol and 1.5 ml. of triethyl amine are added, and the whole is heated at reflux for 10 minutes. After cooling with ice the dye separates out and is collected on filter and washed several times with alcohol and ether. It crystallizes from ethanol as lemon-yellow plates.

Absorption peak: 424 mμ.

The dye corresponds to the formula:

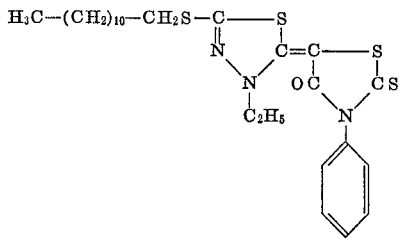

EXAMPLE 12

1 g. of 2,5-bis-(propylthio)-1,3,4-thiadiazole and 1.5 ml. of diethyl sulfate are heated at 248.0° F. (120° C.) for 10 minutes on an oil bath. The quaternary salt thus formed is thoroughly washed with ether and then is mixed with 0.9 g. of 3-phenyl rhodanine together with 15 ml. of ethanol and 1.5 ml. of triethyl amine. The mixture is heated at reflux for 10 minutes, then cooled with ice. The dye separates out and is collected on filter, where it is directly washed with alcohol and ether. It crystallizes from ethanol as small, lemon-yellow colored plates.

Absorption peak: 425 mμ.

The dye corresponds to the formula:

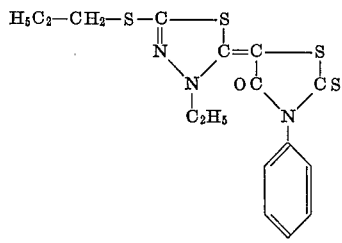

EXAMPLE 13

1.1 g. of 2,5-bis(β-phenylethylthio)-1,3,4-thiadiazole and 1.5 ml. of diethyl sulfate are heated together on an oil bath at 248.0° F. (120° C.) for 10 minutes. The quaternary salt thus formed, after careful washing with ether, is mixed with 0.65 g. of 3-phenyl rhodanine, and 15 ml. of ethanol and 15 ml. of triethyl amine are added. The resulting mixture is then heated at reflux for 10 minutes, cooled with ice and filtered. The dye is washed with alcohol and then with ether directly on the filter. It recrystallizes from ethanol as slightly orange yellow-colored plates.

Absorption peak: 424 mμ.

It corresponds to the formula:

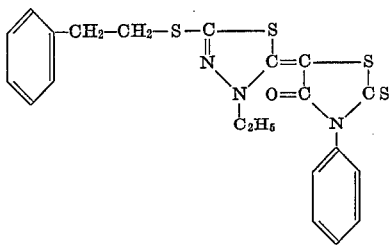

EXAMPLE 14

1.1 g. of 2,5-bis-(β-phenylethylthio)-1,3,4-thiadiazole and 1.5 ml. of diethyl sulfate are heated together on an oil bath at 248.0° F. (120° C.) for 10 minutes. The quaternary salt thus formed, after washing with ether by decantation, is mixed with 0.57 g. of 3-butyl rhodanine. To the resulting mixture 15 ml. of ethanol and 1.5 ml. of triethyl amine are then added, and the whole is heated at reflux for 10 minutes. Then the mass is cooled with ice and filtered. The dye is washed directly on the filter with alcohol and ether. By recrystallization from ethanol it separates out as orange yellow plates.

Absorption peak: 424 mμ.

It corresponds to the formula:

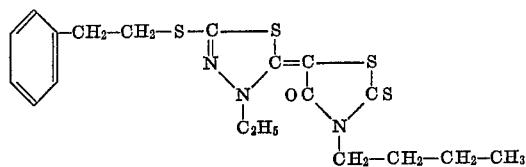

EXAMPLE 15

1.1 g. of 2,5-bis-(β-phenylethylthio)-1,3,4-thiadiazole and 1.5 ml. of diethyl sulfate are heated on an oil bath at 248.0° F. (120° C.) for 10 minutes. The quaternary salt thus formed is thoroughly washed with ether by decantation and is treated with 0.53 g. of 3-propyl rhodanine. Then 15 ml. of ethanol and 1.5 ml. of triethyl amine are added. The reactants are heated together for 10 minutes, then the mass is cooled with ice water and filtered. The dye is washed directly on the filter with alcohol and ether. It crystallizes from ethanol as lemon-yellow platelets.

Absorption peak: 424 mμ.

The dye corresponds to the formula:

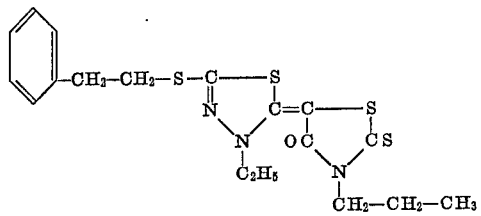

EXAMPLE 16

1.45 g. of 2,5-bis-(laurylthio)-1,3,4-thiadiazole and 1.5 ml. of diethyl sulfate are heated for 10 minutes on an oil bath at 248.0° F. (120° C.). The quaternary salt is washed by decantation with ether and is then mixed with 0.52 g. of 3-propyl rhodanine. To the resulting mixture 15 ml. of ethanol and 1.5 ml. of triethyl amine are added, and the whole is heated at reflux for 15 minutes and cooled with ice water. The dye which separates is collected on a filter and thoroughly washed with alcohol and ether. It crystallizes from ethanol as lemon-yellow platelets.

Absorption peak: 424 mμ.

It corresponds to the formula:

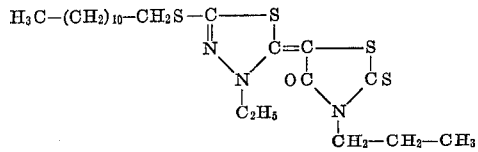

EXAMPLE 17

1.1 g. of 2,5-bis-(β-phenylethylthio)-1,3,4-thiadiazole and 1.5 ml. of diethyl sulfate are heated together for 10 minutes on an oil bath at 248.0° C. (120° C.). The quaternary salt thus formed is washed by decantation with ether and is then reacted with 0.52 g. of 3-allyl rhodanine in 15 ml. of ethanol and 1.5 ml. of triethyl amine by heating at reflux for 10 minutes. The reaction mixture is cooled with ice and the dye which separates is collected on a filter, where it is thoroughly washed with ether and alcohol before recrystallization from ethanol. It crystallizes as orange platelets.

Absorption peak: 424 mμ.

It corresponds to the formula:

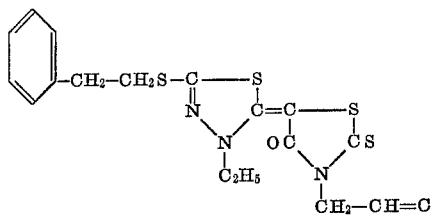

EXAMPLE 18

0.8 g. of 2,5-bis(benzylthio)-1,3,4-thiadiazole and 1.5 ml. of diethyl sulfate are heated together at 248.0° F. (120° C.) for 10 minutes on an oil bath, and the quaternary salt which forms is washed with ether by decantation. To this 0.4 g. of 3-propyl rhodanine, 15 ml. of ethanol and 1.5 ml. of triethyl aniline are added and the mass is stirred with a rod in order to assist the homogenization of the reaction mixture. After a short while the dye separates out directly without heating. It is collected on a filter and is washed directly thereon several times with alcohol and ether. It crystallizes from ethanol as lemon-yellow platelets.

Absorption peak: 423 mμ.

The dye corresponds to the formula:

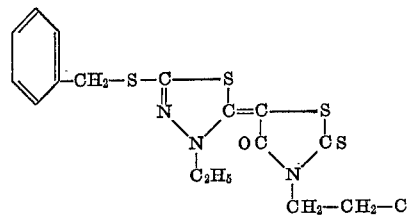

EXAMPLE 19

1.45 g. of 2,5-bis-(laurylthio)-1,3,4-thiadiazole and 1.5 ml. of diethyl sulfate are heated at 248.0° F. (120° C.) on an oil bath for 10 minutes. The quaternary salt thus formed is thoroughly washed with ether and is condensed with 0.5 g. of 3-ethyl rhodanine in 15 ml. of ethanol and 1.5 ml. of triethyl amine. The solution is heated at reflux for a maximum of 10 minutes, then is cooled with ice. The dye is collected on a filter and is washed several times with alcohol and ether. When recrystallized from ethanol it separates as chrome yellow-colored platelets.

Absorption peak: 423 mμ.

It corresponds to the formula:

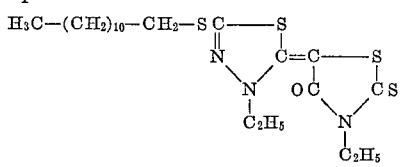

The apomerocyanines of the present invention are particularly useful in the preparation of silver halide photographic emulsions because of the outstanding sensitivity which they produce. Their introduction into the photographic emulsion is carried out according to known photographic methods using solvents which are compatible with the emulsion and free from deleterious action on the photosensitive material. A satisfactory procedure for preparing a gelatin-silver halide emulsion, sensitized with the dyes described herein, is the following: the desired amount of dye is dissolved in methanol or other suitable solvent, and a volume of this solution, containing from 10 to 100 mg. of dye, is slowly added to about 1000 ml. of gelatin-silver halide emulsion with stirring to permit the uniform distribution of the dye in the emulsion.

Figure 2:
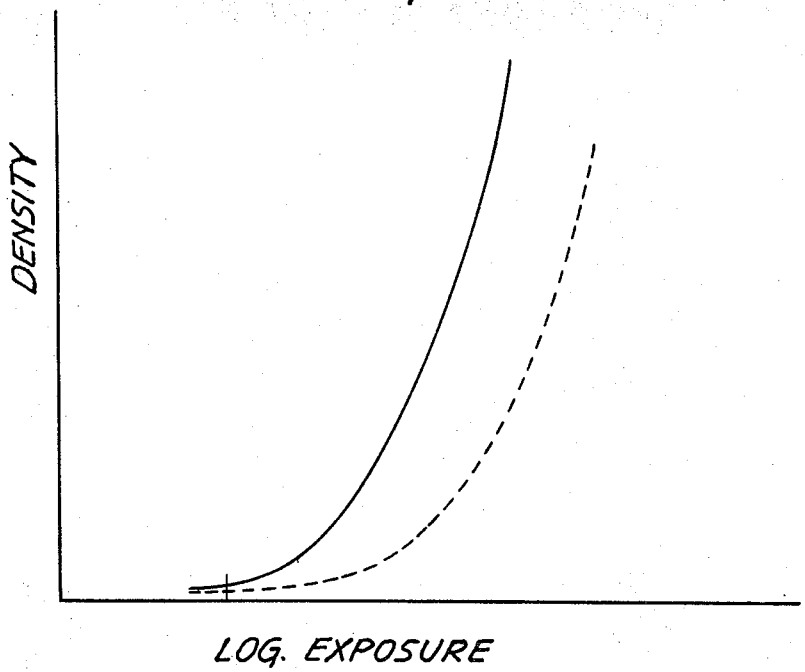

The comparative sensitization of the compounds of this invention and β,β'-dimercaptothiazole (see Example 3 of British Pat. No. 525,609) is shown in FIGS. 1 and 2. FIG. 1 represents the spectral absorption curve of the dye of Example 2 herein (continuous line) and the corresponding absorption curve (discontinuous line) of β,β'-dimercaptothiazole, the former being noticeably broader. As shown in FIG. 2, the dye of Example 2 herein (continuous line) imparts a greater sensitivity to the silver halide photographic emulsion than the β,β'-dimercaptothiazole (discontinuous line). The photographic emulsion used in each instance was a conventional gelatin-silver chlorobromide black-and-white emulsion.

Since the apomerocyanines of this invention are excellent blue sensitizers, they may also be used in emulsions for color reproduction, e.g. in the presence of yellow color formers. In fact, the presence of chromogeneous materials produce an increase in the sensitivity in some instances. These sensitizers may be incorporated into emulsions containing the usual addenda, such as other sensitizers, supersensitizers, antifoggants, stabilizers, surfactants, etc.

Various other embodiments of the present invention will be apparent to those skilled in the art without departing from the scope thereof.

What is claimed is:
1. A photosensitive silver halide emulsion containing an apomerocyanine of the formula

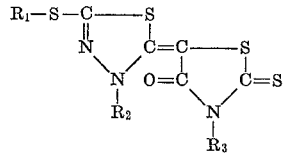

wherein $R_1$ and $R_2$ are alkyl or aralkyl and $R_3$ is alkyl, alkenyl or aryl.

2. A photographic material comprising at least one photosensitive layer which includes the emulsion of claim 1.

3. The emulsion of claim 1 wherein $R_2$ of said apomerocyanine is ethyl.

4. The emulsion of claim 1 wherein $R_3$ of said apomerocyanine is carboxyethyl.

5. The emulsion of claim 1 wherein $R_3$ of said apomerocyanine is allyl.

6. The emulsion of claim 1 wherein $R_3$ of said apomerocyanine is butyl.

7. The emulsion of claim 1 wherein $R_3$ of said apomerocyanine is phenyl.

8. A gelatino-silver halide emulsion sensitized with an apomerocyanine of the formula

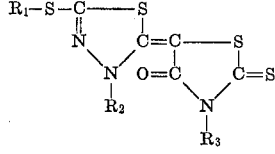

wherein $R_1$ and $R_2$ are alkyl or aralkyl and $R_3$ is alkyl, alkenyl or aryl.

References Cited

Venkataraman, The Chemistry of Synthetic Dyes, Academic Press Inc., 1952, pp. 1185–1186.

Hamer, The Cyanine Dyes, and Related Compounds, John Wiley & Sons, New York, 1964, pp. 729–733.

WILLIAM D. MARTIN, Primary Examiner

M. R. P. PERRONE, Jr., Assistant Examiner

U.S. Cl. X.R.
260—306.7

UNITED STATES PATENT OFFICE
CERTIFICATE OF CORRECTION

Patent No. 3,574,631                    Dated April 13, 1971

Inventor(s) Mario Gandino and Agostino Baldassarri

It is certified that error appears in the above-identified patent and that said Letters Patent are hereby corrected as shown below:

Column 8, line 35 of the formula,

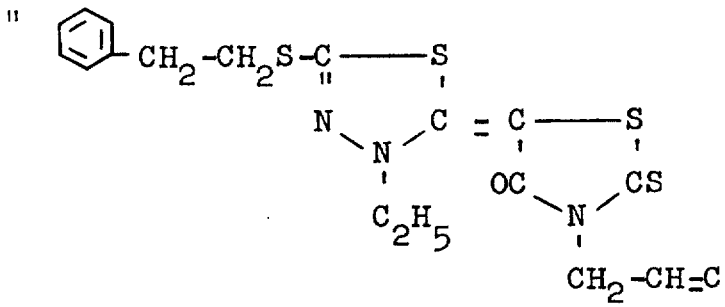

should read

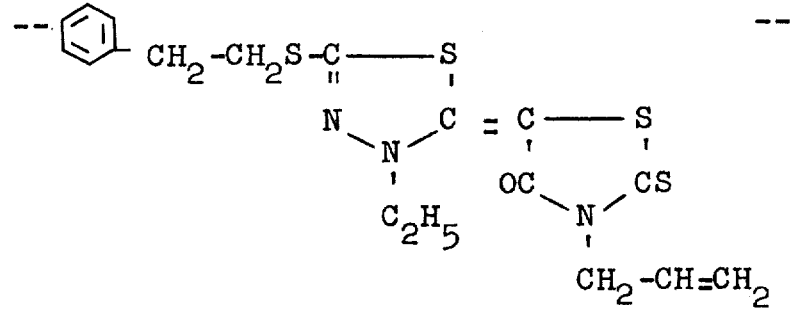

Column 9, line 26, "British Pat. No. 525,609", should read -- British Pat. No. 425,609 --.

Signed and sealed this 12th day of September 1972.

(SEAL)
Attest:

EDWARD M. FLETCHER, JR.
Attesting Officer

ROBERT GOTTSCHALK
Commissioner of Pate